United States Patent
Nakamura et al.

(10) Patent No.: US 10,466,122 B2
(45) Date of Patent: Nov. 5, 2019

(54) SENSOR DEVICE

(71) Applicant: DENSO CORPORATION, Kariya, Aichi-pref. (JP)

(72) Inventors: Koichi Nakamura, Kariya (JP); Masaya Taki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 35 days.

(21) Appl. No.: 15/685,919

(22) Filed: Aug. 24, 2017

(65) Prior Publication Data
US 2018/0058962 A1    Mar. 1, 2018

(30) Foreign Application Priority Data
Aug. 26, 2016  (JP) .................................. 2016-165575

(51) Int. Cl.
| | | |
|---|---|---|
| G01L 5/22 | (2006.01) | |
| B62D 5/04 | (2006.01) | |
| B62D 6/10 | (2006.01) | |
| G05B 15/02 | (2006.01) | |
| G01L 25/00 | (2006.01) | |

(52) U.S. Cl.
CPC .............. *G01L 5/221* (2013.01); *B62D 5/049* (2013.01); *B62D 6/10* (2013.01); *G01L 25/003* (2013.01); *G05B 15/02* (2013.01)

(58) Field of Classification Search
CPC ....................................................... G01L 5/221
See application file for complete search history.

(56) References Cited

U.S. PATENT DOCUMENTS

| | | | | |
|---|---|---|---|---|
| 5,481,718 A | * | 1/1996 | Ryu | G06F 8/24 |
| | | | | 719/316 |
| 5,884,267 A | * | 3/1999 | Goldenthal | G10L 15/24 |
| | | | | 704/270 |
| 9,710,342 B1 | * | 7/2017 | Weinstein | G05B 15/02 |
| 2006/0132302 A1 | * | 6/2006 | Stilp | G05B 9/03 |
| | | | | 340/539.22 |
| 2006/0132303 A1 | * | 6/2006 | Stilp | G05B 9/03 |
| | | | | 340/539.22 |
| 2008/0001734 A1 | * | 1/2008 | Stilp | G05B 9/03 |
| | | | | 340/539.22 |
| 2016/0100696 A1 | * | 4/2016 | Palashewski | A47C 31/00 |
| | | | | 700/90 |

(Continued)

FOREIGN PATENT DOCUMENTS

JP    2015-098223 A    5/2015

*Primary Examiner* — Alex C Dunn
(74) *Attorney, Agent, or Firm* — Knobbe, Martens, Olson & Bear, LLP

(57) ABSTRACT

In a sensor device, microcomputers acquire detection signals from plural sensor sections. A first signal line includes a main line and a sub line, and is capable of bidirectional communication between the sensor section and the microcomputers. A second signal line includes a main line and a sub line, and is capable of bidirectional communication between the sensor section and the microcomputers. A trigger signal is transmitted to the sensor section from the first microcomputer via the main line. A trigger signal is transmitted to the sensor section from the second microcomputer via the main line. Detection of steering torque can be continued in the occurrence of an abnormality in part of the sensor sections or microcomputers.

9 Claims, 10 Drawing Sheets

(56) References Cited

U.S. PATENT DOCUMENTS

| | | | | |
|---|---|---|---|---|
| 2016/0115395 | A1* | 4/2016 | Rustad | C10G 33/08 |
| | | | | 700/282 |
| 2017/0042471 | A1* | 2/2017 | Meriheina | A61B 5/091 |
| 2017/0067530 | A1* | 3/2017 | Swanson | F16F 15/002 |
| 2017/0147009 | A1* | 5/2017 | Jones | G05B 15/02 |
| 2017/0176961 | A1* | 6/2017 | Tirpak | G05B 15/02 |
| 2017/0195130 | A1* | 7/2017 | Landow | H04L 12/2816 |
| 2017/0208266 | A1* | 7/2017 | Lin | H04N 5/357 |
| 2017/0285158 | A1* | 10/2017 | Halbert | G01S 7/003 |
| 2018/0021579 | A1* | 1/2018 | Kahana | A61N 1/0531 |
| | | | | 607/45 |
| 2018/0083682 | A1* | 3/2018 | Li | H04B 7/0626 |
| 2018/0109003 | A1* | 4/2018 | Arcidiacono | H01Q 1/288 |

\* cited by examiner

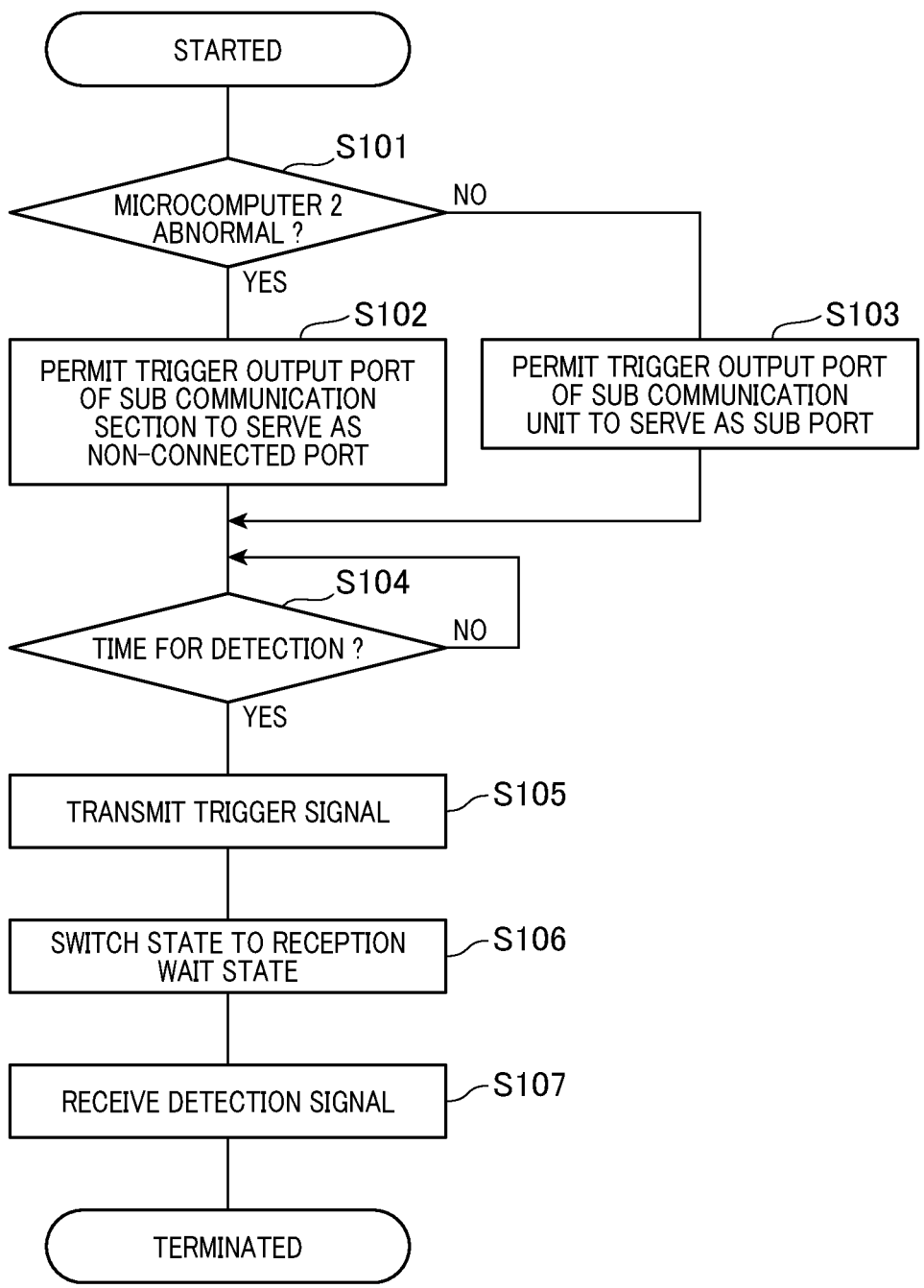

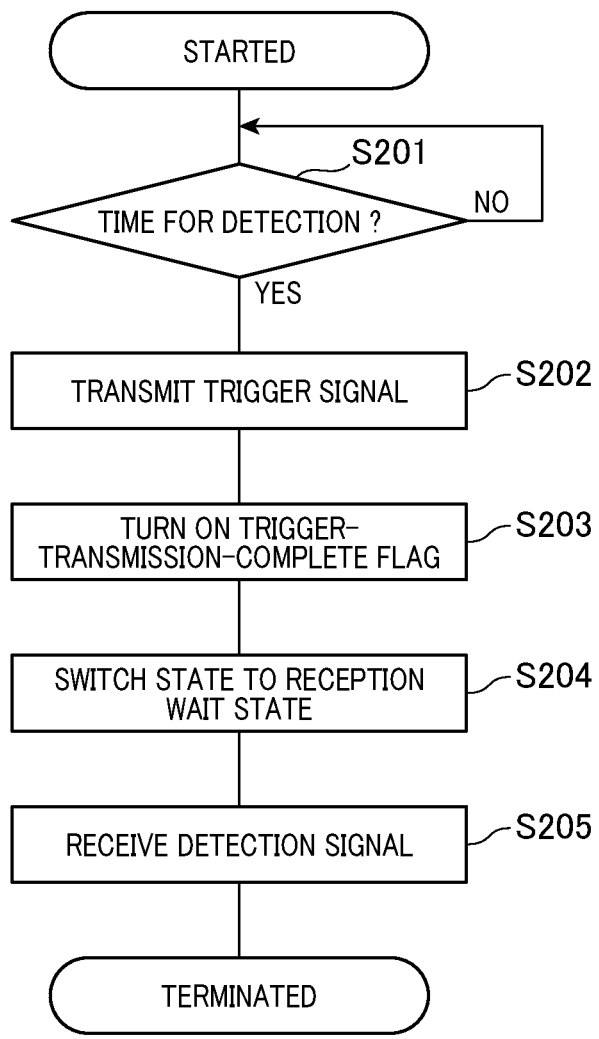

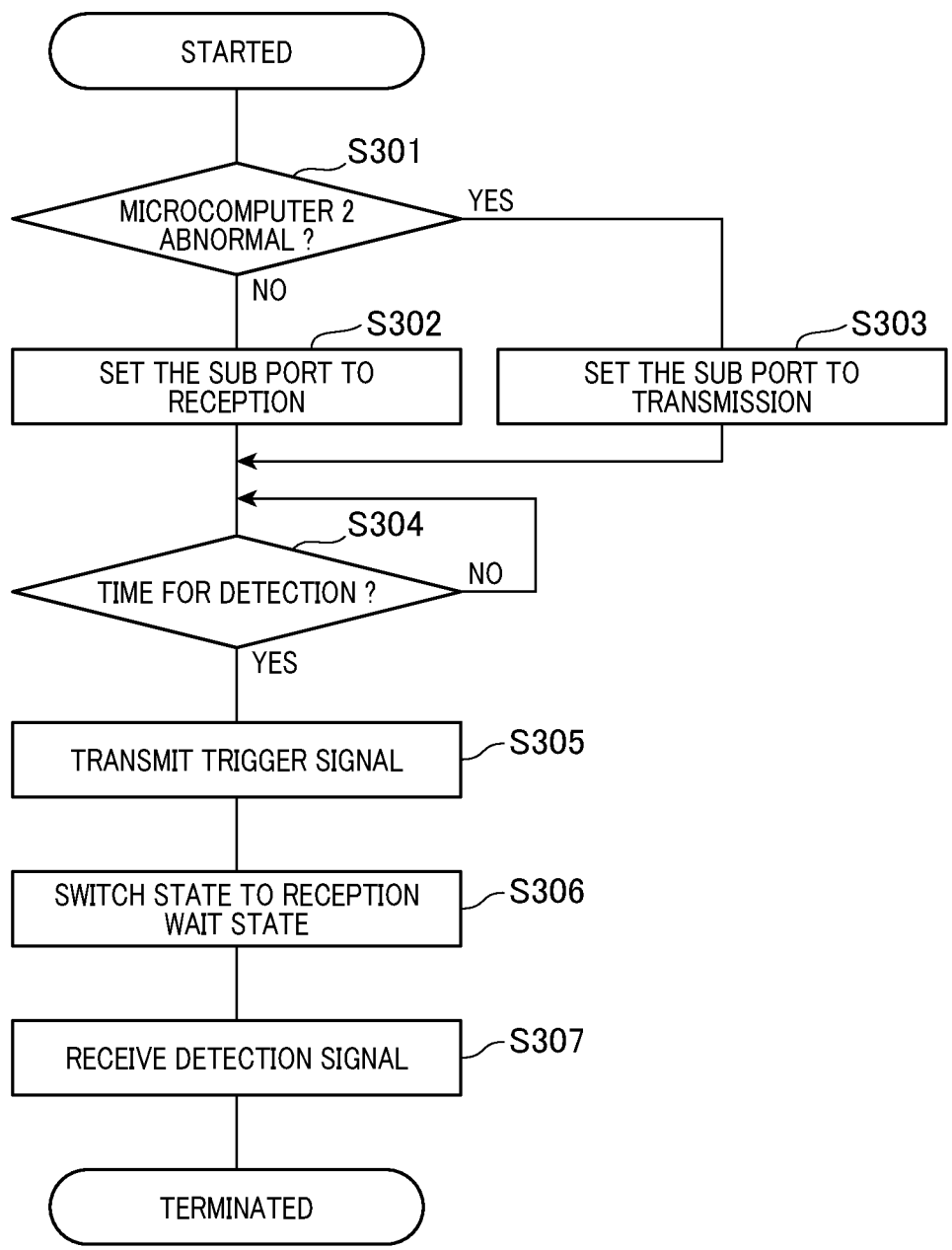

SENSOR DEVICE

CROSS-REFERENCE TO RELATED APPLICATION

This application is based on and claims the benefit of priority from earlier Japanese Patent Application No. 2016-165575 filed on Aug. 26, 2016, the description of which is incorporated herein by reference.

TECHNICAL FIELD

The present disclosure relates to a sensor device.

BACKGROUND

Torque sensors for detecting steering torque are well known. For example, a patent document JP 2015-098223 A discloses a torque sensor that includes two Hall ICs, and detects abnormalities by comparing signals by one central processing unit (CPU).

However, the torque sensor disclosed in the patent document JP 2015-098223 A includes only one CPU. Therefore, when some abnormality occurs in the CPU, detection of steering torque cannot be continued.

SUMMARY

The embodiment provides a sensor device which is able to continue detection in the occurrence of an abnormality in a part of the device.

The sensor device of the present disclosure includes a plurality of sensor sections, a plurality of control units, and a plurality of signal lines.

The sensor sections detect change in a physical quantity and output detection signals in response to trigger signals.

The control units are able to acquire detection signals from the plurality of sensor sections.

The signal lines include main lines and sub lines, and are capable of bidirectional communication between the sensor sections and control units. The main lines each connect one sensor section to a corresponding control unit that is one of the control units provided to correspond to the sensor section. The sub lines branch off from the main lines and each connect the sensor section to the other control units other than the corresponding control unit.

The trigger signals are transmitted to the sensor sections from the corresponding control units via the main lines.

In the present disclosure, a plurality of sensor sections and a plurality of control units are provided, and detection signals are transmitted to each of control units from the plurality of sensor sections, so that detection of a physical quantity can be continued even when an abnormality occurs in part of the sensor sections or control units.

Since a trigger signal is transmitted from a single corresponding control unit to a single sensor section, overlapping or interference of signals does not occur. Accordingly, the control units can adequately acquire detection signals.

BRIEF DESCRIPTION OF THE DRAWINGS

In the accompanying drawings:

FIG. 6 is a flow diagram illustrating a signal transmission/reception process, according to the first embodiment;

FIG. 7 is a flow diagram illustrating a signal transmission/reception process, according to a second embodiment of the present disclosure;

FIG. 8 is a flow diagram illustrating a signal transmission/reception process, according to a third embodiment of the present disclosure.

DETAILED DESCRIPTION OF THE PREFERRED EMBODIMENTS

Figure 1:
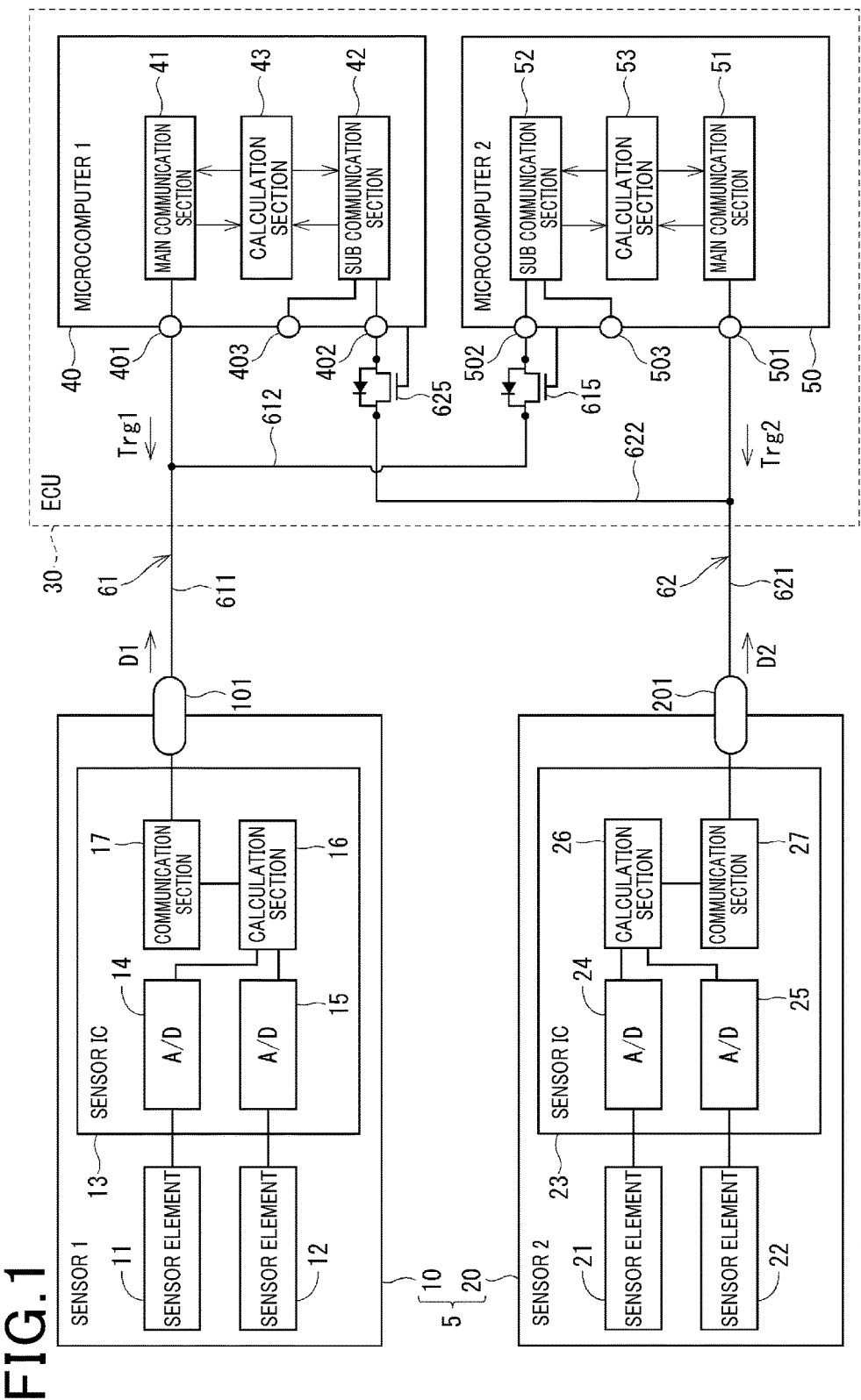
FIG. 1 is a block diagram illustrating a sensor device, according to a first embodiment of the present disclosure.

With reference to the drawings, a sensor device according to the present disclosure will be described. In the several embodiments provided below, the components identical with or similar to each other are given the same reference numerals for the sake of omitting unnecessary explanation.

First Embodiment

Referring to FIGS. 1 to 6, a first embodiment of the present disclosure will be described.

As shown in FIG. 1, a sensor device 1 of the present embodiment includes first and second sensor sections 10 and 20, first and second microcomputers 40, 50 serving as control units, and signal lines 61 and 62. The first and second sensor sections 10 and 20 are included in a sensor unit 5, and the first and second microcomputers 40, 50 are included in an electronic control unit (ECU) 30. In FIG. 1, the first sensor section 10 is indicated as "sensor 1", the second sensor section 20 is indicated as "sensor 2", the first microcomputer 40 is indicated as "microcomputer 1", and the second microcomputer 50 is indicated as "microcomputer 2". Similarly, for windings, ASICs, inverters, motor relays, and the like described later, the "first" and "second" are represented by suffixed numerals "1" and "2", respectively.

Figure 2:
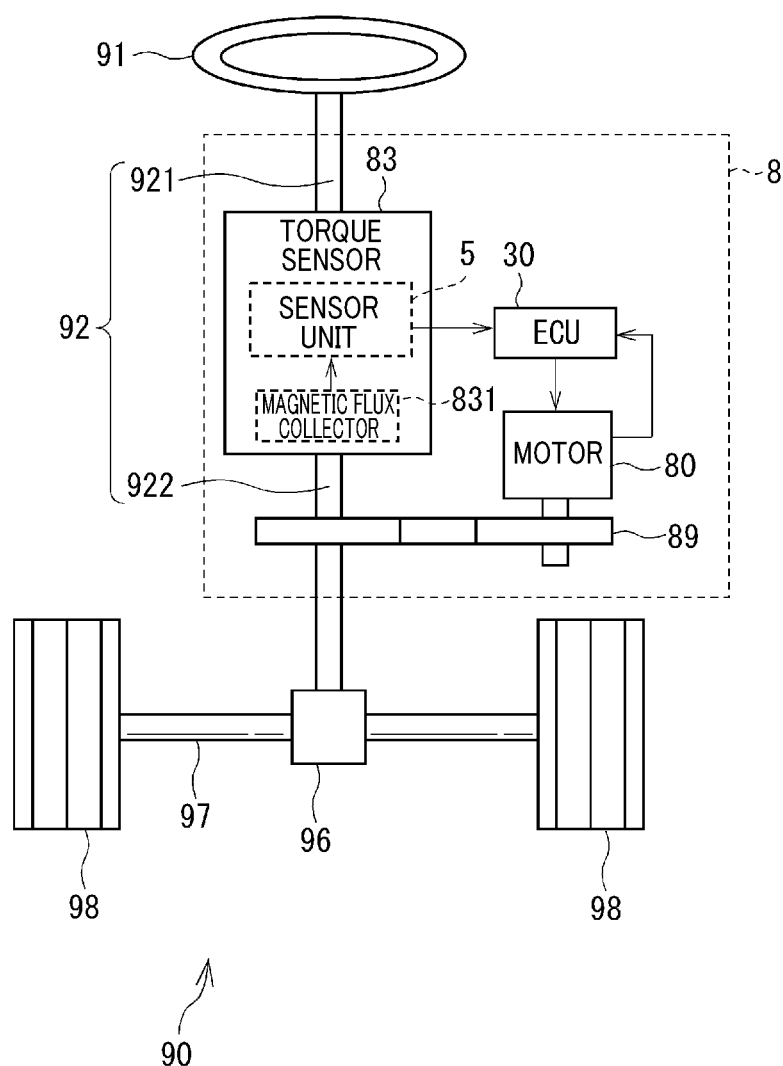
FIG. 2 is a schematic diagram illustrating a steering system, according to the first embodiment.

As shown in FIG. 2, the sensor unit 5 and the ECU 30 are applied, for example, to an electric power steering apparatus 8 for assisting the steering operation of a vehicle. FIG. 2 illustrates an overall configuration of a steering system 90 that includes the electric power steering apparatus 8.

A steering wheel 91 as a steering member is connected to a steering shaft 92. The steering shaft 92 has an input shaft 921 as a first shaft and an output shaft 922 as a second shaft. The input shaft 921 is connected to the steering wheel 91. A torque sensor 83 that detects torque applied to the steering shaft 92 is provided between the input shaft 921 and the output shaft 922.

The torque sensor 83, which is provided to the steering shaft 92, detects steering torque based on the angle of torsion of the input shaft 921 and output shaft 922. The torque sensor 83 includes a torsion bar, not shown, a magnetic flux collector 831 as a detection target, and the sensor unit 5. The torsion bar coaxially connects the input shaft 921 and output shaft 922 on the axis of rotation, and converts the torque applied to the steering shaft 92 to torsional displacement. The magnetic flux collector 831 has a multipolar magnet, a magnetic yoke, a magnetic flux collector ring, and the like, and is configured such that the magnetic flux density thereof changes according to the amount and direction of the torsional displacement of the torsion bar. The typical configuration of such a torque sensor 83 is well known, so the detailed configuration is omitted from FIG. 2.

The output shaft 922 has a tip end on a side opposite to the input shaft 921, which is provided with a pinion gear 96. The pinion gear 96 is in engagement with a rack shaft 97. The rack shaft 97 has ends both of which are connected to a pair of wheels 98 via tie rods or the like.

When the driver turns the steering wheel 91, the steering shaft 92 that is connected to the steering wheel 91 rotates. The rotation movement of the steering shaft 92 is converted to linear movement of the rack shaft 97 by the pinion gear 96, and the pair of wheels 98 are steered at an angle according to the displacement of the rack shaft 97.

The electric power steering apparatus 8 includes a motor 80 that outputs an assist torque for assisting the driver's steering of the steering wheel 91, a reduction gear 89 as a power-transmission unit, the torque sensor 83, and the ECU 30. In FIG. 2, the motor 80 and the ECU 30 are separated, however they may also be integrated into one.

The reduction gear 89 reduces rotation of the motor 80 and transmits the reduced rotation to the steering shaft 92. Specifically, the electric power steering apparatus 8 of the present embodiment is a "column assist type" apparatus in which the driven object is the steering shaft 92. However, the electric power steering apparatus 8 may be a "rack assist type" apparatus in which the driven object is the rack shaft 97, and the rotation of the motor 80 is transmitted to the rack shaft 97.

Figure 3:
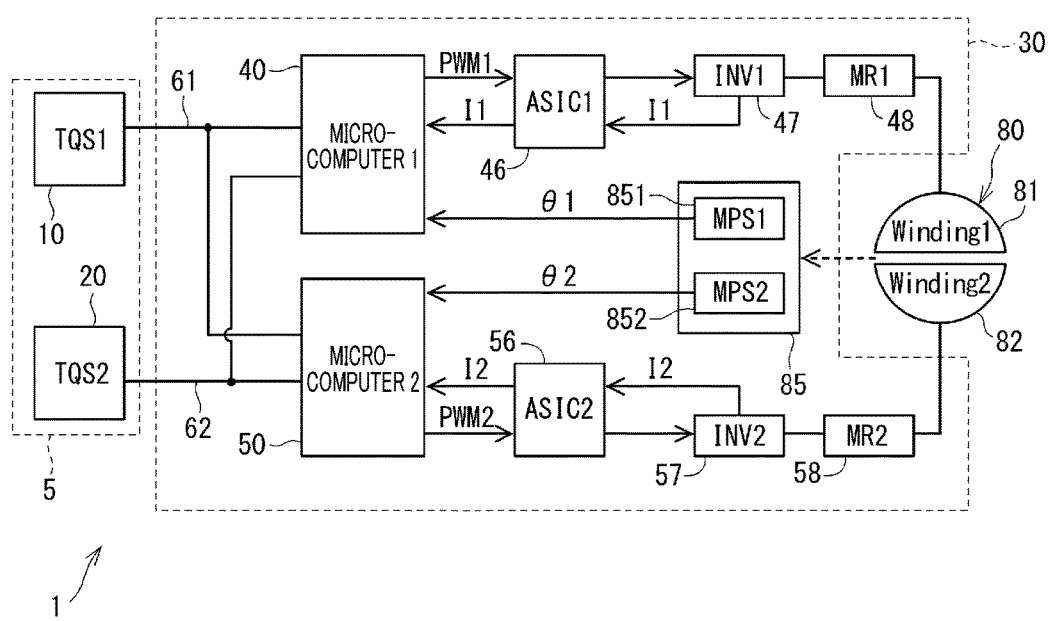
FIG. 3 is a block diagram illustrating a motor and an ECU, according to the first embodiment.

As shown in FIG. 3, the motor 80 is a 3-phase brushless motor, and has a first winding 81 and a second winding 82 that are both 3-phase windings. A rotation angle sensor 85 has a first rotation sensor section 851 and a second rotation sensor section 852, and detects the rotation angle of the motor 80. A rotation angle $\theta 1$ detected by the first rotation sensor section 851 is outputted to the first microcomputer 40, and a rotation angle $\theta 2$ detected by the second rotation sensor section 852 is outputted to the second microcomputer 50.

The ECU 30 includes the first microcomputer 40 that is mainly related to energizing control of the first winding 81, a first ASIC (application specific integrated circuit) 46, a first inverter 47, a first motor relay 48, the second microcomputer 50 that is mainly related to energizing control of the second winding 82, a second ASIC 56, a second inverter 57, and a second motor relay 58.

The processing performed by the ECU 30 may be software processing that is performed by the CPU executing a pre-stored program, or may be hardware processing that is performed by dedicated electronic circuits. In FIG. 3, for convenience, the sensor section is indicated by "TQS", the inverter is indicated by "INV", the motor relay is indicated by "MR", the rotation sensor section is indicated by "MPS", and the winding is indicated by "Winding".

The first microcomputer 40 acquires, via the first ASIC 46, an electrical current I1 of the first winding 81 detected by an electrical current sensor, not shown, and generates a first PWM signal ("PWM1" in FIG. 3), based on the rotation angle $\theta 1$ of the motor 80, the electrical current I1, the steering torque, and the like. The first PWM signal is outputted to the first inverter 47 via the first ASIC 46. The first microcomputer 40 controls the first inverter 47 based on the first PWM signal to control energization of the first winding 81. The motor relay 48 is provided between the first inverter 47 and the first winding 81.

The second microcomputer 50 acquires, via the second ASIC 56, an electrical current I2 of the second winding 82 detected by an electrical current sensor, not shown, and generates a second PWM signal ("PWM2" in FIG. 3), based on the rotation angle $\theta 2$ of the motor 80, the electrical current I2, the steering torque, and the like. The second PWM signal is outputted to the second inverter 57 via the second ASIC 56. The second microcomputer 50 controls the second inverter 57 based on the second PWM signal to control energization of the second winding 82. The motor relay 58 is provided between the second inverter 57 and the second winding 82.

In the following, for convenience, the configuration related to the first winding 81 and energization control of the first winding 81 is taken to be a first system, and the configuration related to the second winding 82 and energization control of the second winding 82 is taken to be a second system.

As shown in FIG. 1, the sensor unit 5 has the first sensor section 10 and the second sensor section 20.

The first sensor section 10 has two sensor elements 11, 12, and a sensor IC 13. The sensor elements 11, 12 are magnetic detection elements that detect change in magnetic flux of the magnetic flux collector 831 corresponding to torque applied to the steering shaft 92. The sensor elements may be configured and arranged so that the outputs become the same, or may be configured and arranged so that the outputs become different, e.g., so that the outputs are inverted from each other. The same applies to sensor elements 21, 22 that will be described later.

The sensor IC 13 has A/D (analog-to-digital) conversion sections 14, 15, a calculation section 16 and a communication section 17.

The A/D conversion section 14 converts the detected value of the sensor element 11 to a digital signal, and the A/D conversion section 15 converts the detected value of the sensor element 12 to a digital signal.

The calculation section 16 performs a calculation process, such as generation of a first detection signal D1 that includes the detected values of the sensor elements 11, 12.

The communication section 17 outputs the first detection signal D1 in response to a first trigger signal Trg1 transmitted from the first microcomputer 40.

The second sensor section 20 has two sensor elements 21, 22, and a sensor IC 13. The sensor elements 21, 22 are magnetic detection elements that detect change in the magnetic flux of the magnetic flux collector 831 corresponding to torque applied to the steering shaft 92.

The sensor IC 23 has A/D conversion sections 24, 25, a calculation section 26 and a communication section 27.

The A/D conversion section 24 converts the detected value of the sensor element 21 to a digital signal, and the A/D conversion section 25 converts the detected value of the sensor element 22 to a digital signal.

The calculation section 26 performs a calculation process, such as generation of a second detection signal D2 that includes the detected values of the sensor elements 21, 22.

The communication section 27 outputs the second detection signal D2 according to a second trigger signal Trg2 transmitted from the second microcomputer 50.

The first sensor section 10 is provided with a communication port 101 which is connected to the first and second microcomputers 40, 50 via the first signal line 61. The second sensor section 20 is provided with a communication port 201 which is connected to the first and second microcomputers 40, 50 via the second signal line 62.

The sensor sections 10, 20 are connected to the ECU 30 via respective power lines, not shown, so that electric power is supplied from the ECU 30 side. The sensor sections 10, 20 are connected to the ground of the ECU 30 via respective ground lines, not shown.

The first microcomputer 40 has a first main communication section 41, a first sub communication section 42, and a first calculation section 43.

The first main communication section 41 is connected to a main port 401. The main port 401 is connected to the first sensor section 10 via the first signal line 61. Thus, the first main communication section 41 is connected to the first sensor section 10, and can acquire the first detection signal D1 outputted from the first sensor section 10.

The first sub communication section 42 is connected to a sub port 402. The sub port 402 is connected to the second sensor section 20 via the second signal line 62. Thus, the first sub communication section 42 is connected to the second sensor section 20, and can acquire the second detection signal D2 outputted from the second sensor section 20. The first sub communication section 42 is connected to a non-connected port 403. The non-connected port 403 is connected to neither of the sensor sections 10, 20.

The first calculation section 43 performs various calculation processes, such as generation of a first PWM signal based on the acquired detection signals D1, D2.

The second microcomputer 50 includes a second main communication section 51, a second sub communication section 52 and a second calculation section 53.

The second main communication section 51 is connected to a main port 501. The main port 501 is connected to the second sensor section 20 via the second signal line 62. As a result, the second main communication section 51 is connected to the second sensor section 20 and can acquire the second detection signal D2 outputted from the second sensor section 20.

The second sub communication section 52 is connected to a sub port 502. The sub port 502 is connected to the first sensor section 10 via the first signal line 61. As a result, the second sub communication section 52 is connected to the first sensor section 10 and can acquire the first detection signal D1 outputted from the first sensor section 10. The second sub communication section 52 is connected to a non-connected port 503. The non-connected port 503 is connected to neither of the sensor sections 10, 20.

The second calculation section 53 performs various calculation processes such as generation of a second PWM signal, based on the acquired detection signals D1, D2.

In the present embodiment, the first sensor section 10 and the first microcomputer 40 are provided so as to correspond with each other, and the second sensor section 20 and the second microcomputer 50 are provided so as to correspond with each other. Moreover, the first and second detection signals D1 and D2 are both transmitted to the microcomputers 40, 50. In other words, the detection signals D1, D2 are "cross inputted" to the microcomputers 40, 50.

The first signal line 61 is connected to the communication port 101 of the first sensor section 10, and to the main port 401 of the first microcomputer 40 and the sub port 502 of the second microcomputer 50.

The first signal line 61 has a main line 611 and a sub line 612. The main line 611 is connected to the communication port 101 of the first sensor section 10 and the main port 401 of the first microcomputer 40. The main port 401 is connected to the first main communication section 41. The sub line 612 branches off from the main line 611 and is connected to the sub port 502 of the second microcomputer 50. The sub port 502 is connected to the second sub communication section 52. A relay 615 is provided to the sub line 612.

The second signal line 62 is connected to the communication port 201 of the second sensor section 20, the main port 501 of the second microcomputer 50, and the sub port 402 of the first microcomputer 40.

The second signal line 62 has a main line 621 and a sub line 622. The main line 621 is connected to the communication port 201 of the second sensor section 20, and the main port 501 of the second microcomputer 50. The main port 501 is connected to the second main communication section 51. The sub line 622 branches off from the main line 621 and is connected to the sub port 402 of the first microcomputer 40. The sub port 402 is connected to the first sub communication section 42. A relay 625 is provided to the sub line 622.

The ON/OFF operation of the relay 615 is controlled by the second microcomputer 50. The relay 615 is turned ON when the second microcomputer 50 is ON, and is turned OFF when the second microcomputer 50 is OFF. As a result, when the second microcomputer 50 is stopped due to abnormality, the relay 625 is turned OFF so that the second microcomputer 50 is electrically disconnected from the first signal line 61.

The ON/OFF operation of the relay 625 is controlled by the first microcomputer 40. The relay 625 is turned ON when the first microcomputer 40 is ON, and is turned OFF when the first microcomputer 40 is OFF. As a result, when the first microcomputer 40 is stopped due to abnormality, the relay 625 is turned OFF and the first microcomputer 40 is electrically disconnected from the second signal line 62.

Signal transmission/reception between the sensor sections 10, 20 and the microcomputers 40, 50 will be described.

The first main communication section 41 transmits a first trigger signal Trg1 to the first sensor section 10 via the first signal line 61. The first sensor section 10 that has received the first trigger signal Trg1 outputs a first detection signal D1. The first detection signal D1 is transmitted to the first and second microcomputers 40, 50 via the first signal line 61. In the first microcomputer 40, the first main communication section 41 acquires the first detection signal D1, and in the second microcomputer 50, the second sub communication section 52 acquires the first detection signal D1.

The second main communication section 51 transmits a second trigger signal Trg2 to the second sensor section 20 via the second signal line 62. The second sensor section 20 that has received the second trigger signal Trg2 outputs a second detection signal D2. The second detection signal D2 is transmitted to the first and second microcomputers 40, 50 via the second signal line 62. In the first microcomputer 40, the first sub communication section 42 acquires the second detection signal D2, and in the second microcomputer 50, the second main communication section 51 acquires the second detection signal D2.

In other words, in the present embodiment, during normal operation, the "main communication section" is the communication section that outputs a trigger signal and acquires a detection signal, and the "sub communication section" is the communication section that acquires a detection signal without outputting a trigger signal.

In the present embodiment, a plurality of microcomputers 40, 50 are connected to a single sensor section 10, and the first signal line 61 is used for transmission/reception of both the first trigger signal Trg1 and the first detection signal D1. Similarly, a plurality of microcomputers 40, 50 are connected to a single sensor section 20, and the second signal line 62 is used for transmission/reception of both the second trigger signal Trg2 and the second detection signal D2. In other words, the first signal line 61 is used for bidirectional communication of the first sensor section 10 and the microcomputers 40, 50, and the second signal line 62 is used for bidirectional communication of the second sensor section 20 and the microcomputers 40, 50.

As a result, the number of terminals and the number of signal lines can be reduced, and thus the sensor device 1 can be made more compact, when compared with a case of dividing the signal paths into a signal path for transmitting signals from the microcomputer to the sensor side, and a signal path for transmitting signals from the sensor section to the microcomputer side.

In the present embodiment, the signal lines 61, 62 are connected to the first and second microcomputers 40, 50. Therefore, when the microcomputers 40, 50 transmit respective trigger signals to each of the signal lines 61, 62, signals interfere or overlap with each other to cause malfunction of the sensor device 1, such as disabling adequate output of detection signals D1, D2 from the sensor sections 10, 20, or causing the microcomputers 40, 50 to incorrectly recognize the trigger signals as detection signals D1, D2.

In this regard, the present embodiment is configured such that a single microcomputer 40 transmits a trigger signal Trg1 to the first sensor section 10, and similarly, a single microcomputer 50 transmits a trigger signal Trg2 to the second sensor section 20. As a result, interference and overlapping of signals can be prevented.

Depending on the type of the microcomputer, there is a device that switches to the reception standby state by outputting a trigger signal. In this kind of microcomputer, the state is not switched to the reception standby state and a signal is not received, unless a trigger signal is outputted.

Figure 4A:
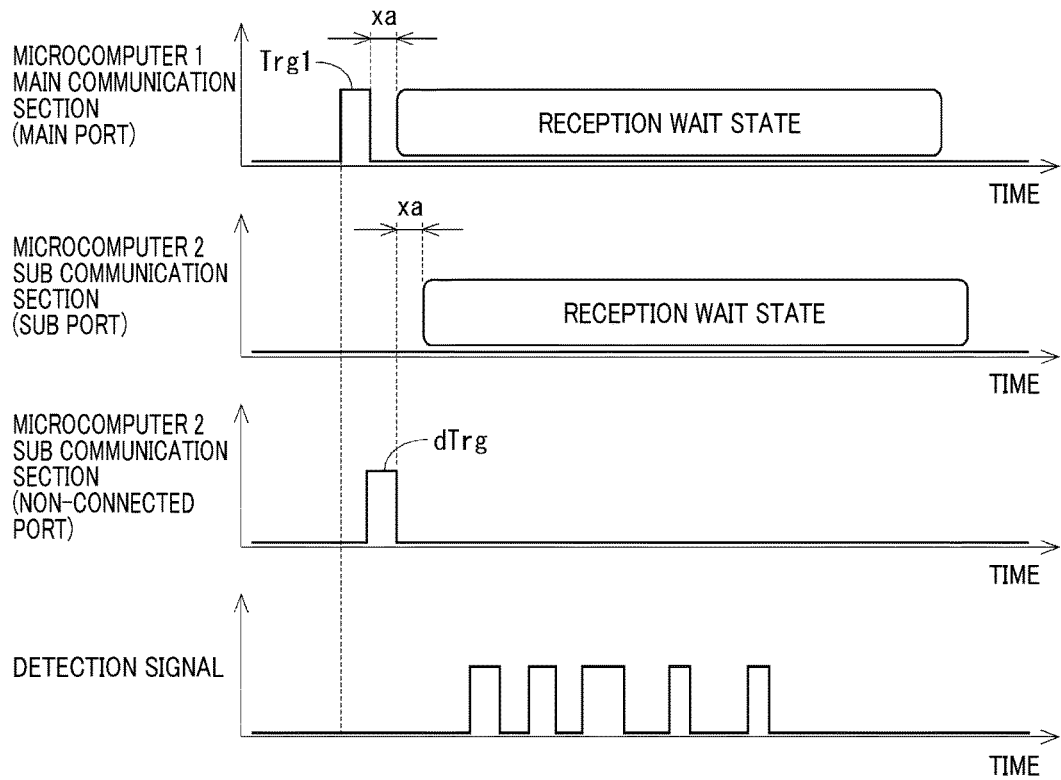
FIGS. 4 A and 4 B are timing diagrams illustrating switching to a reception standby state, according to the first embodiment.
Figure 4B:
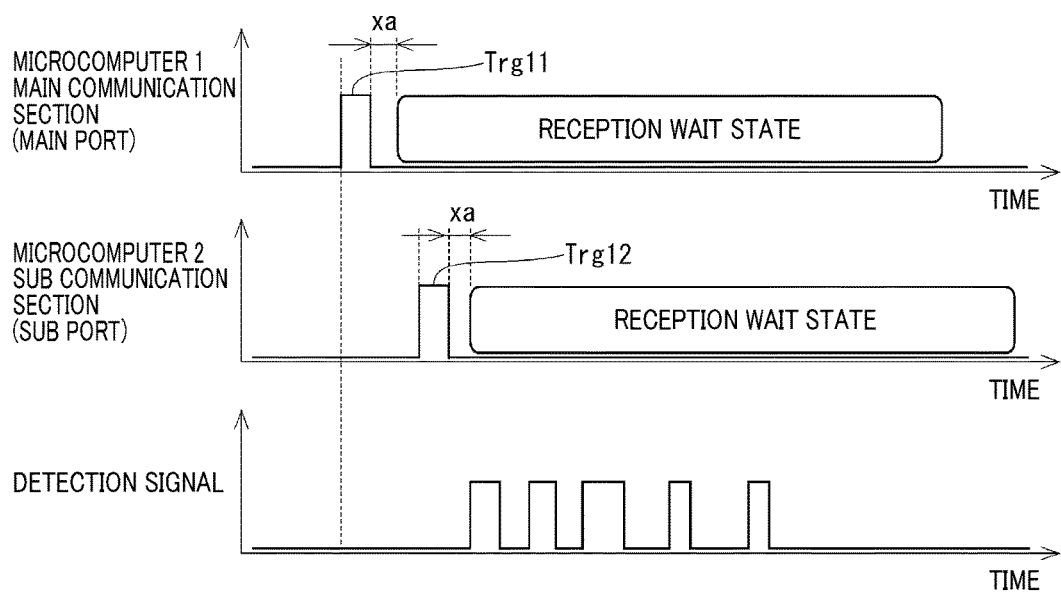

FIGS. 4A and 4B each illustrate an example in which the state is transitioned to a reception standby state after lapse of a predetermined time xa following the output of a trigger signal. The following description will be provided taking an example of the operation of the first sensor section 10 and the first signal line 61. The same operation applies to the second sensor section 20 and second signal line 62.

FIG. 4B shows a reference example in which the main communication section 41 of the first microcomputer 40 outputs a trigger signal Trg11 to the main port 401, and the sub communication section 52 of the second microcomputer 50 outputs a trigger signal Trg12 to the sub port 502.

In the reference example, the trigger signals Trg11, Trg12 are both outputted to the first signal line 61. There is a concern that output timing of the trigger signals Trg11, Trg12 will shift due to effects such as clock deviation. In FIG. 4B, the output timing of the trigger signal Trg12 is later than the trigger signal Trg11.

If the first signal line 61 is used for transmission/reception of both the trigger signals and detection signals, there is a concern that when a trigger signal Trg12 is outputted while the main communication section 41 is in the reception standby state, the trigger signal Trg12 will be incorrectly recognized as a detection signal D1.

In this regard, in the present embodiment, as shown in FIG. 4A, the second sub communication section 52 outputs a dummy trigger signal dTrg to the non-connected port 503. By outputting a dummy trigger signal dTrg to the non-connected port 503, the state of the second sub communication section 52 is switched to a reception standby state.

Similarly, by the first sub communication section 42 outputting a dummy trigger signal dTrg to the non-connected port 403, the state of the first sub communication section 42 is switched to a reception standby state.

In other words, with blank transmission of dummy trigger signals dTrg to the non-connected ports 403, 503 in the present embodiment, the state of the sub communication sections 42, 52 is switched to a reception standby state.

In the present embodiment, the dummy trigger signal dTrg has the same pulse as the trigger signals Trg1, Trg2. The non-connected ports 403, 503 to which the dummy trigger signals dTrg are outputted are not connected to the sensor sections 10, 20, so the dummy trigger signals dTrg do not function as triggers requesting output of detection signals D1, D2.

Dummy trigger signals dTrg are outputted to the non-connected ports 403, 503, but not outputted to the signal lines 61, 62. Therefore, in spite of being in the reception standby state at the output timing of the dummy trigger signals dTrg, the main communication sections 41, 51 do not incorrectly recognize the dummy trigger signals dTrg as the detection signals D1, D2.

Referring to FIGS. 5A to 5D, the processing in the occurrence of an abnormality in a part of the sensor device 1 will be described. FIGS. 5A to 5D only simply illustrate the connection relationship of the sensor sections 10, 20 and the microcomputers 40, 50.

Figure 5A:
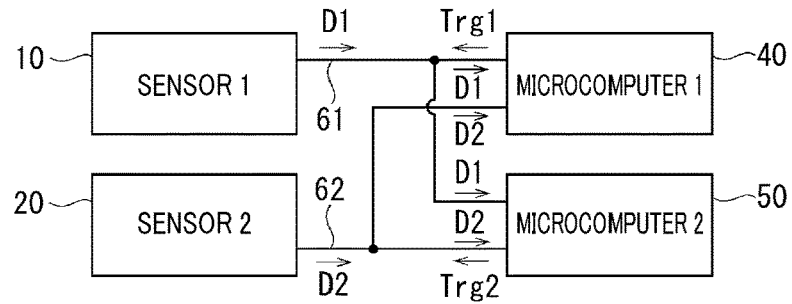
FIGS. 5 A to 5 D are block diagrams illustrating transmission/reception of signals in the presence of abnormality, according to the first embodiment.

FIG. 5A shows the case in which the sensor sections 10, 20 and the microcomputers 40, 50 are all normal. When the sensor sections 10, 20 and the microcomputers 40, 50 are all normal, the first microcomputer 40 transmits a first trigger signal Trg1 to the first sensor section 10, and the second microcomputer 50 transmits a second trigger signal Trg2 to the second sensor section 20. In response to the first trigger signal Trg1, the first sensor section 10 transmits a first detection signal D1 to the microcomputers 40, 50. In response to the second trigger signal Trg2, the second sensor section 20 transmits a second detection signal D2 to the microcomputers 40, 50.

Figure 5B:
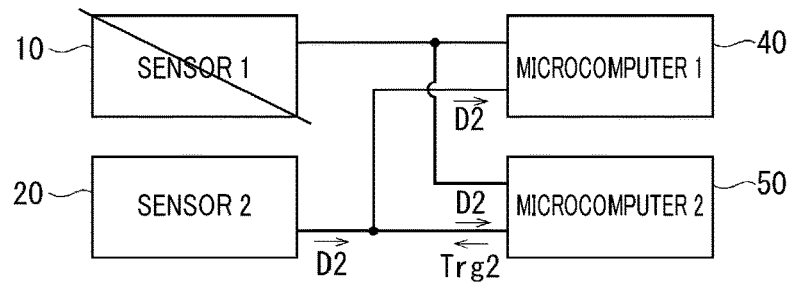

FIG. 5B shows an example of a case in which an abnormality occurs in the first sensor 10. In this case, the microcomputers 40, 50 can continue calculations in the calculation section 43, 53 using the second detection signal D2. The same applies to a case in which an abnormality occurs in the second sensor section 20, that is, the microcomputers 40, 50 can continue calculations in the calculation sections 43, 53 using the first detection signal D1.

Therefore, even when an abnormality occurs in one of the sensor sections 10, 20, driving control of the motor 80 can be continued using the two systems in the same way as in normal operation.

Figure 5C:
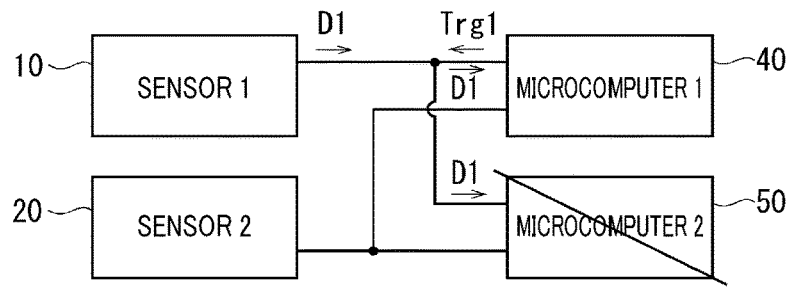

FIG. 5C shows an example of a case in which an abnormality occurs in the second microcomputer 50. In this case, the first microcomputer 40 can continue calculation in the calculation section 43 using the first detection signal D1. Since there is an abnormality in the second microcomputer 50, driving control of the motor 80 can be continued using the first system without using the second system.

When an abnormality occurs in the second microcomputer 50, the relay 615 is turned OFF, and the second microcomputer 50 is disconnected from the first signal line 61. For example, when an abnormality, such as a grounding error, occurs in a line connected to the first signal line 61 in the second microcomputer 50, and when no relay 615 is provided, there is a concern that operation will be affected by the abnormality of the second microcomputer 50, disabling signal exchange between the first sensor section 10 and the first microcomputer 40. In the present embodiment, when there is an abnormality in the second microcomputer 50, the relay 615 is turned OFF to disconnect the second microcomputer 50 from the first signal line 61 and avoid adverse effect of the abnormality of the second microcomputer 50. Thus, signals transmission/reception can be continued between the first sensor section 10 and the first microcomputer 40.

When an abnormality occurs in the first microcomputer 40, the second microcomputer 50 can continue calculation in the calculation section 53 using the second detection signal D2. Since there is an abnormality in the first microcomputer 40, the driving control of the motor 80 can be continued using the second system without using the first system.

When an abnormality occurs in the first microcomputer 40, the relay 625 is turned OFF to disconnect the first microcomputer 40 from the second signal line 62. As in the case of abnormality in the second microcomputer 50, when an abnormality occurs in the first microcomputer 40, the relay 625 is turned OFF to disconnect the first microcomputer 40 from the second signal line 62 and avoid any adverse effect from the abnormality of the first microcomputer 40). Thus, signal transmission/reception between the second sensor section 20 and the second microcomputer 50 can be continued.

In the example shown in FIG. 5C, when an abnormality occurs in the first sensor section 10 in addition to an abnormality of the second microcomputer 50, the first microcomputer 40 is not able to acquire the detection signals D1, D2, so driving of the motor 80 stops, and the assisting operation stops. Similarly, when an abnormality occurs in the second sensor section 20 in addition to an abnormality in the first microcomputer 40, the second microcomputer 50 is not able to acquire the detection signals D1, D2, so driving of the motor 80 stops, and the assisting operation stops. In other words, when double failure occurs, the assisting operation stops.

Figure 5D:
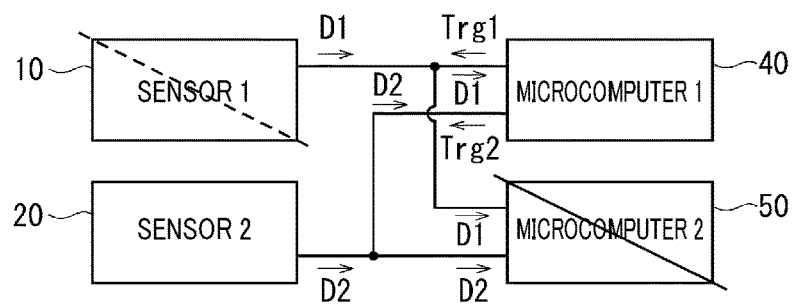

As shown in FIG. 5D, when an abnormality occurs in the second microcomputer 50, the first microcomputer 40 may be configured to transmit a second trigger signal Trg2 to the second sensor section 20, so that driving of the motor 80 can be continued even when double failure occurs.

Specifically, when an abnormality occurs in the second microcomputer 50, the sub communication section 42 of the first microcomputer 40, instead of outputting a dummy trigger signal dTrg to the non-connected port 403, outputs a second trigger signal Trg2 to the sub port 402. As described above, the dummy trigger signal dTrg and the second trigger signal Trg2 have the same pulse, so this can be regarded as the first sub communication section 42 switching the port that outputs the trigger signal. Since there is an abnormality in the second microcomputer 50 and the second trigger signal Trg2 is not outputted from the second microcomputer 50, even though the first microcomputer 40) outputs the second trigger signal Trg2, there is no interference or overlapping of the second trigger signal Trg2.

In other words, when there is an abnormality in the second microcomputer 50, the second trigger signal Trg2 is transmitted to the second sensor section 20 from the first microcomputer 40. Thus, the second sensor section 20 can output a second detection signal D2 to the first microcomputer 40 according to the second trigger signal Trg2 from the first microcomputer 40. As a result, the first microcomputer 40 can continue calculation based on the detection signals D1, D2. Moreover, transmission source of the trigger signal Trg2 to the second sensor section 20 is changed to the first microcomputer 40, so that even when an abnormality occurs in the first sensor section 10 in addition to an abnormality in the second microcomputer 50, the first microcomputer 40 can continue driving of the motor 80 using the second detection signal D2.

Furthermore, when an abnormality occurs in the first microcomputer 40, the sub communication section 52 of the second microcomputer 50 outputs a first trigger signal Trg1 to the sub port 502 instead of outputting a dummy trigger signal dTrg to the non-connected port 503.

In other words, when there is an abnormality in the first microcomputer 40, a first trigger signal Trg1 is transmitted to the first sensor section 10 from the second microcomputer 50, so that the first sensor section 10 can output a first detection signal D1 to the second microcomputer 50 according to the first trigger signal Trg1 from the second microcomputer 50. As a result, the second microcomputer 50 can continue calculation based on the detection signals D1. D2. Moreover, the transmission source of the trigger signal Trg1 to the first sensor section 10 is changed to the second microcomputer 50, so that the second microcomputer 50 can continue driving of the motor 80 using the first detection signal D1 even when an abnormality occurs in the second sensor section 20 in addition to an abnormality in the first microcomputer 40.

Referring now to the flowchart of FIG. 6, a signal transmission/reception process of the present embodiment will be described. Herein, the processing of the first microcomputer 40 will be described. In the following, "step" in step S101 is omitted, and will be simply indicated with a symbol "S". The same applies to other steps.

First, in S101, the first microcomputer 40 determines whether there is an abnormality in the second microcomputer 50. If it is determined that the second microcomputer 50 is normal (NO in S101), control proceeds to S102. If it is determined that there is an abnormality in the second microcomputer 50 (YES in S101), control proceeds to S103.

In S102, the first microcomputer 40 allows the trigger output port of the sub communication section 42 to serve as the non-connected port 403.

In S103, the first microcomputer 40 allows the trigger output port of the sub communication section 42 to serve as the sub port 402.

In S104, the first microcomputer 40 determines whether the time has come for detection. In this case, when the count C of a reception counter that counts up reception of signal at specified intervals becomes greater than a set value Cth. or in other words, when C>Cth, the first microcomputer 40 determines that the time has come for detection. When the first microcomputer 40 determines that the time has not come for detection (NO in S104), the next iteration of the determination process is executed. When the first microcomputer 40 determines that the time has come for detection (YES in S104), control proceeds to S105.

In S105, the first microcomputer 40 transmits a trigger signal. Specifically, the main communication section 41 outputs a first trigger signal Trg1 to the main port 401. As a result, the first trigger signal Trg1 is transmitted to the first sensor section 10 via the first signal line 61. When the second microcomputer 50 is normal, the sub communication section 42 outputs a dummy trigger signal dTrg to the non-connected port 503. When the second microcomputer 50 is abnormal, the sub communication section 42 outputs a second trigger signal Trg2 to the sub port 402. As a result, the second trigger signal Trg2 is transmitted to the second sensor section 20 via the second signal line 62.

In S106, the first microcomputer 40 switches the mode of the ports 401, 402 to a reception mode, and switches the state of the communication sections 41, 42 to a reception standby state.

In S107, the first microcomputer 40 receives detection signals D1, D2 that are transmitted from the sensor sections 10, 20.

The processing of the second microcomputer 50 is substantially the same. When the first microcomputer 40 is normal, the trigger output port of the sub communication section 52 serves as the non-connected port 503, and when the first microcomputer 40 is abnormal, the trigger output port of the sub communication section 52 serves as the sub port 502. When it is the time of detection, the second microcomputer 50 transmits a trigger signal, switches the state to a reception standby state, and receives detection signals D1, D2.

As described above, the sensor device 1 of the present embodiment includes a plurality of sensor sections 10, 20, a plurality of microcomputers 40, 50, and a plurality of signal lines 61, 62.

The first sensor section 10 detects change in the magnetic flux of the magnetic flux collector 831 corresponding to steering torque, and outputs a first detection signal D1 in response to a first trigger signal Trg1. The second sensor section 20 detects change in the magnetic flux of the magnetic flux collector 831 corresponding to steering torque, and outputs a second detection signal D2 according to a second trigger signal Trg2 signal. In the present embodiment, "the magnetic flux of the magnetic flux collector 831 corresponding to steering torque" corresponds to a "physical quantity".

The microcomputers 40, 50 can acquire the detection signals D1, D2 from the plurality of sensor sections 10, 20.

The first signal line 61 has the main line 611 and the sub line 612, and is capable of bidirectional communication between the first sensor section 10 and the microcomputers 40, 50. The main line 611 connects a single sensor section 10 to a single microcomputer 40 that is provided to correspond to the sensor section 10. The sub line 612 branches off from the main line 611, and connects the first sensor section 10 to the second microcomputer 50 that is a microcomputer other than the first microcomputer 40. In the present embodiment, the "corresponding control unit" that is provided to correspond to the first sensor section 10 is the first microcomputer 40.

The second signal line 62 has the main line 621 and the sub line 622, and is capable of bidirectional communication between the second sensor section 20 and the microcomputers 40, 50. The main line 621 connects a single sensor section 20 to a single microcomputer 50 that is provided to correspond to the sensor section 20. The sub line 622 branches off from the main line 621, and connects the second sensor section 20 to the first microcomputer 40 that is a microcomputer other than the second microcomputer 50. In the present embodiment, the "corresponding control unit" that is provided to correspond to the second sensor section 20 is the second microcomputer 50.

A first trigger signal Trg1 is transmitted to the first sensor section 10 from the first microcomputer 40 via the main line 611.

A second trigger signal Trg2 is transmitted to the second sensor section 20 from the second microcomputer 50 via the main line 621.

In the present embodiment, a plurality of sensor sections 10, 20 and a plurality of microcomputers 40, 50 are provided, and detection signals D1, D2 of the sensor sections 10, 20 are transmitted to the respective microcomputer 40, 50. Thus, detection of steering torque can be continued even when an abnormality occurs in part of the sensor sections 10, 20 or microcomputers 40, 50. Moreover, operation using the normally operating microcomputers 40, 50 can be continued.

The signal lines 61, 62 are capable of bidirectional communication, and can be used for transmission/reception of both the trigger signals Trg1, Trg2 and the detection signals D1, D2. Thus, the number of signal lines and the number of terminals can be reduced, when compared with a case of not sharing signal lines.

In the present embodiment, a trigger signal is transmitted to a single sensor section from a single corresponding control unit. Therefore, overlapping and interference of signals do not occur even when the clocks of the plurality of microcomputers are not perfectly synchronized. Accordingly, the microcomputers 40, 50 can adequately acquire detection signals D1, D2.

When an abnormality occurs in the first microcomputer 40, the normal second microcomputer 50 transmits a trigger signal Trg1 via the sub line 612 to the first sensor section 10 of which the first microcomputer 40 is the corresponding control unit.

When an abnormality occurs in the second microcomputer 50, the normal first microcomputer 40 transmits a trigger signal Trg2 via the sub line 622 to the second sensor section 20 of which the second microcomputer 50 is the corresponding control unit.

Thus, the normal microcomputer can continue acquisition of a detection signal from the sensor section of which the corresponding microcomputer has caused an abnormality. Moreover, operation can be continued in the occurrence of a double failure that is the failure of the first microcomputer 40 followed by the failure of the second sensor section 20, or a double failure that is the failure of the second microcomputer 50 followed by the failure of the first sensor section 10.

The first microcomputer 40 includes the main communication section 41 that is connected to the main line 611 to transmit a first trigger signal Trg1 and receive a first detection signal D1, and the sub communication section 42 that is connected to the sub line 622 to receive a detection signal D2.

The second microcomputer 50 includes the main communication section 51 that is connected to the main line 621 to transmit a second trigger signal Trg2 and receive a second detection signal D2, and the sub communication section 52 that is connected to the sub line 612 to receive a detection signal D1.

The state of the main communication sections 41, 51 is switched to a reception standby state after transmission of trigger signals Trg1, Trg2.

The state of the sub communication sections 42, 52 is switched to a reception standby state after output of dummy trigger signals dTrg to the non-connected ports 403, 503 which are connected to neither of the sensor sections 10, 20.

Thus, in the case of using microcomputers of a type that conduct switching between transmission and reception after transmission of a trigger signal, the state of the sub communication sections 42, 52, which do not transmit trigger signals to the sensor sections 10, 20, can be adequately switched to a reception standby state.

The sub lines 612, 622 are provided with the relays 615, 625, respectively.

When an abnormality occurs in the second microcomputer 50, the relay 615 is turned OFF to electrically disconnect the main line 611 from the second microcomputer 50 and avoid adverse effect of the abnormality of the second microcomputer 50. Thus, signal exchange can be continued between the first sensor section 10 and the first microcomputer 40.

Similarly, when an abnormality occurs in the first microcomputer 40, the relay 625 is turned OFF to electrically disconnect the main line 621 from the first microcomputer 40 and avoid adverse effect of the abnormality of the first microcomputer 40. Thus, signal exchange can be continued between the second sensor section 20 and the second microcomputer 50.

Second Embodiment

FIG. 7 shows a second embodiment of the present disclosure.

The second embodiment and the subsequent third embodiment are mainly different from the first embodiment in the signal transmission/reception process. In the following, the difference will be described focusing on the processing of the first microcomputer 40.

The processing in S201 of FIG. 7 is similar to the processing in S104 of FIG. 6.

In S202, the first microcomputer 40 transmits a first trigger signal Trg1 to the first sensor section 10. In the present embodiment, the first sub communication section 42 does not transmit a dummy trigger signal dTrg.

In S203, the first microcomputer 40 turns ON a trigger-transmission-complete flag.

The processing in S204 and S205 is similar to the processing in S106 and S107.

FIG. 7 does not refer to the case in which an abnormality occurs in the second microcomputer 50. However, as in the first embodiment, when an abnormality occurs in the second microcomputer 50, a trigger signal Trg2 may be transmitted from the sub communication section 42 to the second sensor section 20.

In the processing of the second microcomputer 50 in S202, a second trigger signal Trg2 is transmitted to the second sensor 20. The second sub communication section 52 does not transmit a dummy trigger signal dTrg. The rest of the processing is similar to the processing executed by the first microcomputer 40.

When an abnormality occurs in the first microcomputer 40, a trigger signal Trg1 may be transmitted to the first sensor section 10 from the sub communication section 52.

In the present embodiment, the state of the sub communication sections 42, 52 is switched to a reception standby state by the microcomputers 40, 50, at a software level. Specifically, the sub communication sections 42, 52 do not transmit dummy trigger signals dTrg, but turn ON the trigger-transmission-complete flag to assume at a software level that a trigger has been transmitted, so that the state of the sub communication sections 42, 52 is switched to a reception standby state. Thus, the non-connected ports 403, 503 for blank transmission of dummy trigger signals dTrg can be omitted.

The present embodiment provides advantageous effects similar to those of the first embodiment described above.

Third Embodiment

FIG. 8 shows a third embodiment of the present disclosure.

The processing in S301 of FIG. 8 is similar to the processing in S101 of FIG. 6, that is, when the second microcomputer 50 is normal, control proceeds to S302, and when the second microcomputer 50 is abnormal, control proceeds to S303.

In S302, the first microcomputer 40 allows the sub port 402 to serve as a reception port.

In S303, the first microcomputer 40 allows the sub port 402 to serve as a transmission/reception port.

The processing in S304 is similar to the processing in S104.

In S305, the first microcomputer 40 transmits a trigger signal. Specifically, the main communication section 41, as in the first embodiment, transmits a first trigger signal Trg1 to the main port 401. When the second microcomputer 50 is normal, the sub communication section 42 does not transmit a trigger signal. When the second microcomputer 50 is abnormal, the sub communication section 42 transmits a second trigger signal Trg2 to the second sensor section 20.

In S306, the first microcomputer 40 switches the mode of the main port 401 to a reception mode to allow the main communication section 41 to be in a reception standby state. When the second microcomputer 50 is abnormal, the first microcomputer 40 switches the mode of the sub port 402 to a reception mode to allow the sub communication section 42 to be in a reception standby state. When the second microcomputer 50 is normal, the sub port 402 has been allowed to serve as a reception port, and thus the sub communication section 42 can constantly be in a reception standby state. Accordingly, it is not necessary to conduct switching between transmission and reception.

The processing in S307 is similar to the processing in S107.

When the first microcomputer 40 is normal, the second microcomputer 50 allows the sub port 502 to serve as a reception port. When the first microcomputer 40 is abnormal, the second microcomputer 50 allows the sub port 502 to serve as a transmission/reception port. Moreover, when the first microcomputer 40 is normal, the sub communication section 52 does not transmit a trigger signal, and when the first microcomputer 40 is abnormal, the sub communication section 52 transmits a trigger signal Trg1 to the first sensor section 10 to switch the mode of the sub port 502 to a reception mode.

The rest of the processing is similar to the processing of the first microcomputer 40.

In the present embodiment, when the second microcomputer 50 is normal, the sub port 402 can serve as a reception port, and thus a second trigger signal Trg2, and a second detection signal D2 that is outputted from the second microcomputer 50 are inputted to the sub port 402. Therefore, the first microcomputer 40 needs to distinguish whether the received pulse is a trigger signal Trg2 or a detection signal D2.

In the present embodiment, the trigger signal Trg2 and the detection signal D2 are distinguished from each other by making the signal pattern of the trigger signal Trg2 and the start pulse of the detection signal D2 different.

Figure 9A:
FIGS. 9 A to 9 C are timing diagrams illustrating signal patterns for a trigger signal and a detection signal, according to the third embodiment.
Figure 9B:
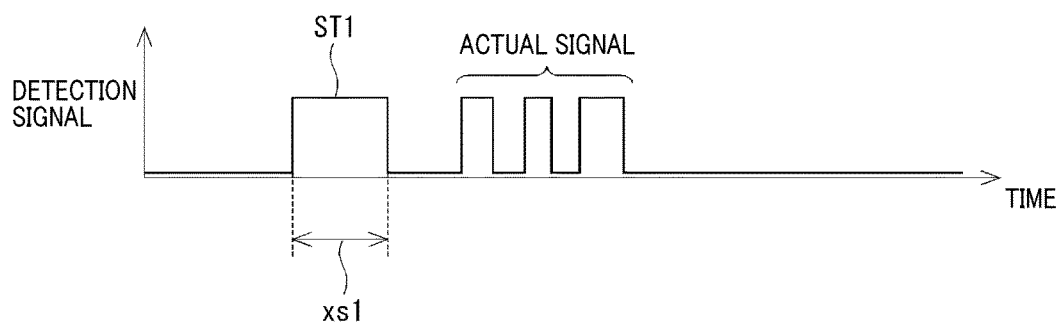

For example, as shown in FIG. 9A, the trigger signal Trg2 is taken to be a single pulse of not more than a predetermined duration xs1, and as shown in FIG. 9B, a start pulse ST1 of the detection signal D2 is taken to be a pulse of not less than the predetermined duration xs1. In other words, a pulse of not more than the predetermined duration xs1 is set to be recognized as a trigger signal Trg1, and a pulse of not less than the predetermined duration xs1 is set to be recognized as a start pulse ST1, so that a pulse following the start pulse ST1 is detected as the actual signal pulse. Thus, the actual pulse that follows the start pulse ST1 can be adequately detected without incorrectly recognizing the trigger signal Trg2 as a detection signal D2.

Figure 9C:
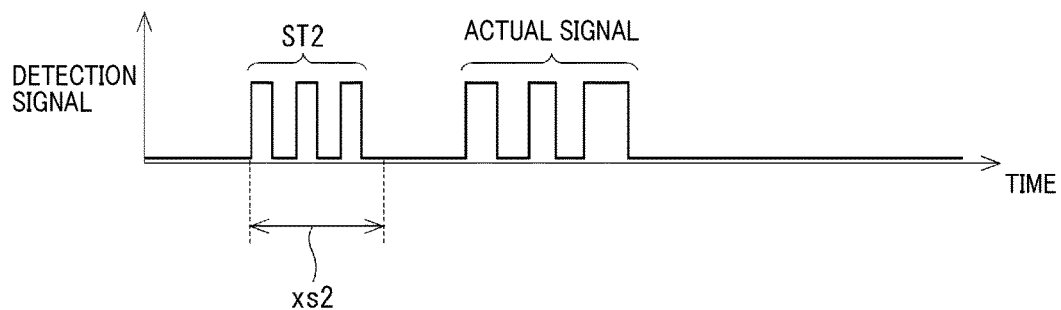

For example, in FIG. 9C, a start pulse ST2 is set to n or more pulses in a predetermined duration xs2, and pulses of less than n times are set to be recognized as a trigger signal Trg2. It should be noted that n is a natural number that is 2 or greater, and is 3 in FIG. 9C. With these settings, the actual pulse that follows the start pulse ST2 can be adequately detected without incorrectly recognizing the trigger signal Trg2 as a detection signal D2.

The description set forth above has been provided, taking an example of distinguishing between the second trigger signal Trg2 and the second detection signal D2 in the first microcomputer 40. Distinction between the first trigger signal Trg1 and the first detection signal D1 is similarly made in the second microcomputer 50.

In the present embodiment, when the second microcomputer 50 is normal, the sub communication section 42 is always in a reception standby state. Similarly, when the first microcomputer 40 is normal, the sub communication section 52 is always in a reception standby state. Thus, when the other microcomputer is normal, there is no need to conduct switching between transmission and reception for the sub communication sections 42, 52.

The microcomputers 40, 50 distinguish the trigger signals Trg1. Trg2 from the detection signals D1, D2, based on signal patterns of the trigger signals Trg1, Trg2 and the detection signals D1, D2. Thus, when the microcomputers 40, 50 are normal, the sub communication sections 42, 52 can always be in a reception standby state.

Advantageous effects similar to those in the foregoing embodiments can be achieved.

Other Embodiments (A) Detection Signals, Trigger Signals

In the foregoing embodiments, the detection signals are digital signals. In other embodiments, the detection signals may be analog signals. In this case, the A/D conversion sections, calculation sections and the like in the sensor sections may be omitted.

In the third embodiment, a trigger signal and a detection signal are distinguished from each other, based on the length or the number of pulses of a start pulse of the detection signal. In other embodiments, a trigger signal and a detection signal may be distinguished from each other, based on a combination of the length and the number of pulses of a start pulse. Alternatively, the signals may be distinguished from each other by imparting characteristics to the pulses of the trigger signal. The signal pattern that can distinguish a trigger signal from a detection signal may be applied to the first and second embodiments.

(B) Sensor Device

In the foregoing embodiments, two sensor sections and two microcomputers are provided in the sensor device. In other embodiments, three or more sensor sections may be provided. Moreover, three or more microcomputers may be provided. Furthermore, the number of sensor sections may be different from the number of microcomputers.

In the foregoing embodiments, the sub lines are provided with relays. In other embodiments, relays may be omitted. Alternatively, a relay may also be provided to the main line further on the microcomputer side than the position from which the sub line branches off.

Figure 10:
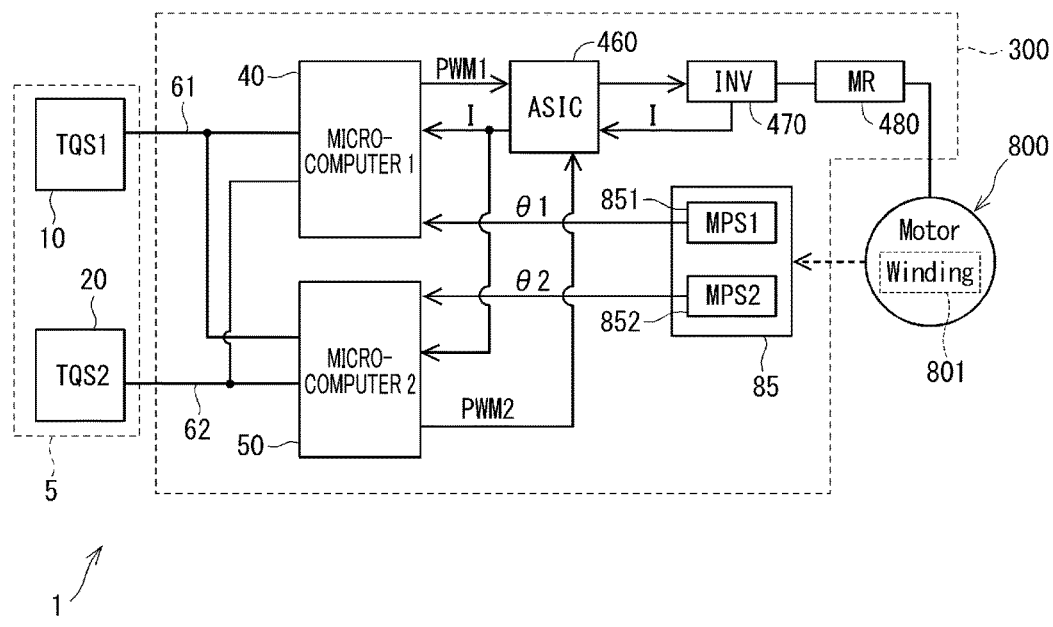
FIG. 10 is a block diagram illustrating a motor and an ECU according to another embodiment of the present disclosure.

In the foregoing embodiments, the motor is provided with two sets of windings, and the ECU is provided with two each of an ASIC, inverter and motor relay. In other embodiments, as shown in FIG. 10, a motor 800 may be provided with one set of windings 801. In such a case, as shown in FIG. 10, an ECU 300 may be provided one each of an ASIC 460, inverter 470 and motor relay 480.

In the foregoing embodiments, the motor is a 3-phase brushless motor. In other embodiments, the motor is not limited to a 3-phase brushless motor, but may be any kind of motor.

In the foregoing embodiments, the sensor sections detect change in magnetic flux corresponding to steering torque as a physical quantity, and the sensor device serves as a torque sensor. In other embodiments, the sensor sections may detect a physical quantity other than magnetic flux. Moreover, the sensor device may be a device other than a torque sensor.

In the foregoing embodiments, the sensor device is applied to an electric power steering apparatus. In other embodiments, the sensor device may be applied to an apparatus other than an electric power steering apparatus.

The present disclosure should not be construed as being limited to the embodiments described above, but may be embodied in various forms within a range not departing from the scope of the disclosure.

What is claimed is:

1. A sensor device comprising:
a plurality of sensor sections comprised of a first sensor section and a second sensor section, each of the first and second sensor sections detecting change in a physical quantity and outputting a corresponding detection signal in response to a corresponding trigger signal;
a plurality of control units comprised of a first control unit and a second control unit; and
a plurality of signal lines comprised of a first signal line and a second signal line, each of the first and second signal lines being capable of bidirectional communication between a corresponding one of the first and second sensor sections and a corresponding one of the first and second control units,
each of the first and second signal lines including a main line and a sub line, the main line of the first signal line independently connecting the first sensor section to the first control unit,
the main line of the second signal line independently connecting the second sensor section to the second control unit,
the sub line of the first signal line branching off from the main line of the first signal line and independently connecting the first sensor section to the second control unit,
the sub line of the second signal line branching off from the main line of the second signal line and independently connecting the second sensor section to the first control unit, wherein
the trigger signals are transmitted to the first and second sensor sections from the corresponding first and second control units via the respective first and second main lines.

2. The sensor device according to claim 1, wherein, in response to an abnormality occurring in any one of the control units, one of the control units that is normal transmits the trigger signal, via the sub line of the corresponding signal line, to the sensor section of which the control unit having the abnormality is the corresponding control unit.

3. The sensor device according to claim 1, wherein
the first and second control units include corresponding first and second main communication sections and corresponding first and second sub communication sections, the first and second main communication sections being connected to the main lines of the corresponding first and second signal lines to transmit the trigger signals, and receive the detection signals, the first and second sub communication sections being connected to the sub lines of the corresponding first and second signal lines to receive the detection signals;
The first and second main communication sections transmit the trigger signals to switch the state of the first and second main communication sections to a reception standby state; and
The first and second sub communication sections output dummy trigger signals to non-connected ports that are not connected to any of the sensor sections to switch the state of the first and second sub communication sections to the reception standby state.

4. The sensor device according to claim 1, wherein
the first and second control units include corresponding first and second main communication sections and corresponding first and second sub communication sections, the first and second main communication sections being connected to the main lines of the corresponding first and second signal lines to transmit the trigger signals, and receive the detection signals, the first and second sub communication sections being connected to the sub lines of the corresponding first and second signal lines to receive the detection signals;
the first and second main communication sections transmit the trigger signals to switch the state of the first and second main communication sections to a reception standby state; and
the state of the first and second sub communication sections is switched, at a software level, to a reception standby state by the first and second control units.

5. The sensor device according to claim 1, wherein
the first and second control units include corresponding first and second main communication sections and corresponding first and second sub communication sections, the first and second main communication sections being connected to the main lines of the corresponding first and second signal lines to transmit the trigger signals, and receive the detection signals, the first and second sub communication sections being connected to the sub lines of the corresponding first and second signal lines to receive the detection signals;
the first and second main communication sections transmit the trigger signals to switch the state of the first and second main communication sections to a reception standby state; and
the first and second sub communication sections are always in a reception standby state in response to other control units being normal.

6. The sensor device according to claim 1, wherein the control units distinguish between the trigger signals and the detection signals, based on signal patterns of the trigger signals and the detection signals.

7. The sensor device according to claim 1, wherein the sub lines of the first signal line and the second signal line are provided with relays.

8. The sensor device according to claim 1, wherein the first control unit comprises a first microcomputer and the second control unit comprises a second microcomputer.

9. The sensor device according to claim 1, wherein the main line of the first signal line independently connects the first sensor section to only the first control unit, and the main line of the second signal line independently connects the second sensor section to only the second control unit.

* * * * *